Feb. 16, 1932.   E. E. SLICK   1,844,987

BLOCK MOLD

Filed Oct. 5, 1928

INVENTOR

Edwin E. Slick

Patented Feb. 16, 1932

1,844,987

UNITED STATES PATENT OFFICE

EDWIN E. SLICK, OF PITTSBURGH, PENNSYLVANIA

BLOCK MOLD

Application filed October 5, 1928. Serial No. 310,536.

This invention relates generally to molds for making glass articles and the like, and particularly to a block mold for making glass and similar articles having insignia stamped in or projecting from the surface of the article.

Heretofore in the art to which this invention relates, it has been customary to make such articles provided with insignia in split molds. Split molds have certain disadvantages, among which are that the articles produced therein show the parting line of the mold parts.

This and other undesirable features are eliminated by the employment of a block mold made in accordance with my invention. I provide a block mold in which at least one of the surfaces of the mold is provided with an opening in which a retractible die is arranged. The article is formed in the mold with the die in its innermost position and thereafter the die is retracted so that the molded article may be easily removed from the mold.

Figure 1:
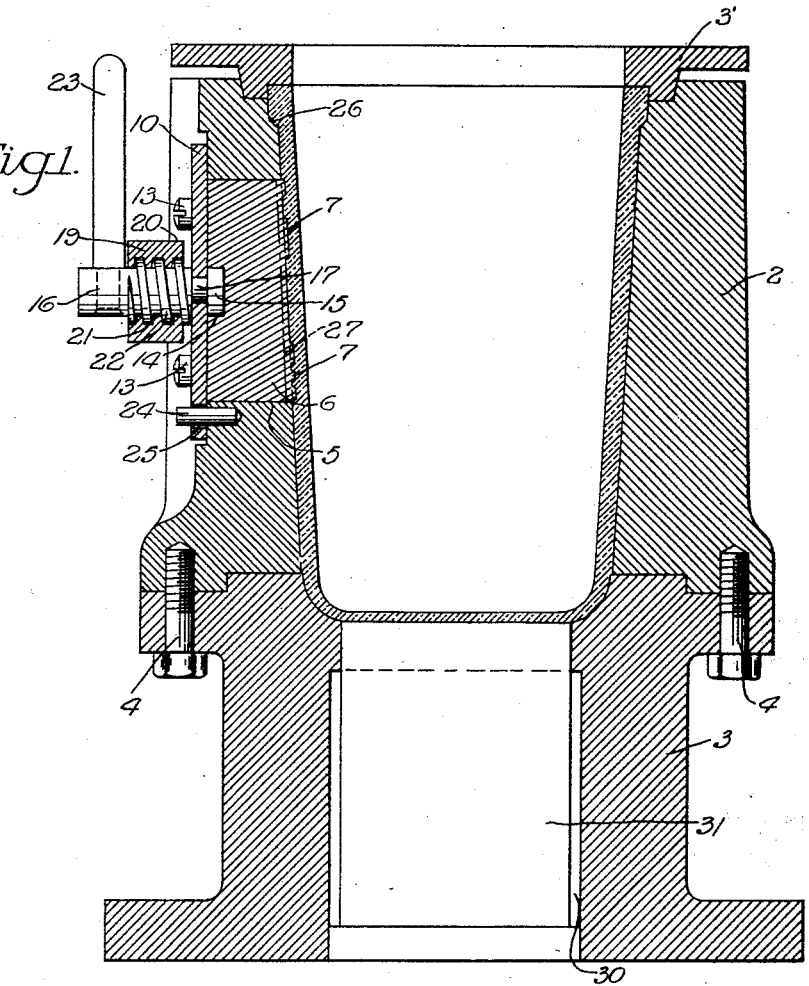
Figure 2:
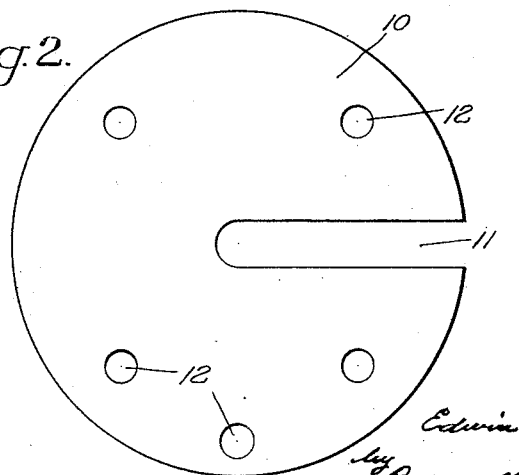

In the accompanying drawings which illustrate the present preferred embodiment of my invention, Figure 1 is a vertical section of a mold adapted to make glass battery jars, and showing the retractible die, and Figure 2 is a side elevation of the plate connecting the retractible die with the means for moving the die toward and away from the mold cavity.

Referring to the preferred embodiment illustrated in the drawings, a mold 2 is secured to a base 3 by means of screws 4. The mold cavity shown is of a form suitable for making glass battery jars. The mold 2 is provided with a top ring 3' of any usual or desired construction. One surface of the mold 2 is provided with an opening 5 extending from the outer surface of the mold to the mold cavity. A retractible die 6 provided with insignia 7 is arranged within the opening 6. A plate 10 having a radial slot 11 is provided with openings 12 adapted to receive screws 13 in order to fasten the plate to the die. The die 6 is provided with a recess 14 in which the head 15 of a screw 16 is arranged. The neck 17 of the screw is arranged within the radial slot 11.

A cross-head 19 is set in a recess 20 provided in the outer surface of the mold 2, and is secured to the mold by any desired means. The cross-head is provided with a screw-threaded opening 21 which cooperates with the threads 22 on screw 16. The screw 16 is actuated by means of a handle 23. A dowel pin 24 secured to the mold 2 extends through an opening 25 in the plate 10 and prevents the plate from rotating when the handle 23 is operated.

The wall 2 of the mold is further provided with a ledge 26 which has insignia for marking the water line of the battery jar. This ledge extends outwardly from the mold cavity and upwardly in the direction of draw of the molded article.

The base 3 of the mold is made hollow to provide an opening 30 in which a plunger 31 is arranged. The top of the plunger is of a shape suitable for forming the bottom of the molded article. The plunger 31 is slidable in the opening 30 in order to aid in the removal of the article from the mold after the article has been formed.

In using the mold to form a glass or similar article the plunger 31 is arranged in the position shown in Figure 1. The retractible die 6 is also arranged as shown in the same figure. A charge of plastic material is introduced into the mold and the article is formed by forcing a plunger into the mold. After the article has been formed, the top ring 3 is removed and the handle 23 is operated in order to withdraw the retractible die 6 from the mold cavity. After operating the handle 23 the inner surface of the die assumes the position indicated by the line 27. In this position the article may be removed from the mold by exerting force on the bottom of the plunger 31 in order to partially lift the article from the mold, after which it may be fully removed from the mold in the usual manner.

If desired the plunger 31 may be eliminated, in which case the article after being formed, is removed from the mold by turning the mold upside-down.

My invention provides a block mold adapted to make glass or similar articles having insignia thereon. The employment of a block eliminates the disadvantages incident to the employment of split molds for such work.

It should be understood that the insignia provided in the inner surface of the retractible die, and the insignia provided in the ledge 26 may either extend outwardly from the molding surfaces or may be indented in such surfaces in order to form articles having the insignia in intaglio or in relief.

I have illustrated and described in detail the present preferred form of my invention. It is to be understood, however, that the invention may be otherwise modified without departing from the spirit of the invention or the scope of the following claims.

I claim:—

1. A block mold for pressing glass articles and the like, which comprises a mold wall provided with an opening, a die having insignia provided in its molding face arranged in the opening, and rotatable means for moving said die toward and away from the mold cavity.

2. A block mold for pressing glass articles and the like, which comprises a mold wall provided with an opening, a die having insignia provided in its molding face arranged in the opening, and cooperating screw-threaded members adapted to move said die inwardly and outwardly upon rotation of one of the members.

3. A block mold for pressing glass articles and the like, which comprises a mold wall provided with an opening, a die having insignia provided in its molding face arranged in the opening, a plate having a radial slot secured to said die, and means cooperating with said plate and die for moving said die relatively to the mold cavity.

4. A block mold for pressing glass articles and the like, which comprises a mold wall provided with an opening, a die having insignia provided in its molding face arranged in the opening, a plate having a radial slot secured to said die, a cross-head having a screw-threaded recess secured to said mold, and rotatable screw means cooperating with said cross-head, said plate, and said die for moving said die relatively to the mold cavity.

In testimony whereof I have hereunto set my hand.

EDWIN E. SLICK.